United States Patent [19]

Voss et al.

[11] Patent Number: 5,273,143
[45] Date of Patent: Dec. 28, 1993

[54] ARRANGEMENT FOR OPERATING A FRICTION CLUTCH OF A MOTOR VEHICLE, IN PARTICULAR OF A TRUCK

[75] Inventors: Reiner Voss, Maibach; Bernd Gaubitz, Niederwerrn; Gerhard Gasper, München; Holger Westendorf, Dittelbrunn, all of Fed. Rep. of Germany

[73] Assignee: Fichtel & Sachs AG, Schweinfurt, Fed. Rep. of Germany

[21] Appl. No.: 922,276

[22] Filed: Jul. 29, 1992

[30] Foreign Application Priority Data

Jul. 30, 1991 [DE] Fed. Rep. of Germany ....... 4125162

[51] Int. Cl.$^5$ .............................................. B60K 41/22
[52] U.S. Cl. ................................ 192/3.58; 192/84 R; 192/85 R
[58] Field of Search ................... 192/3.58, 84 R, 85 R, 192/3.57

[56] References Cited

U.S. PATENT DOCUMENTS

| | | | |
|---|---|---|---|
| 3,738,460 | 6/1973 | Murakami et al. | 192/3.58 |
| 4,131,184 | 12/1978 | Rumyantsev et al. | 192/3.58 X |
| 4,275,804 | 6/1981 | Szarka et al. | 192/3.58 |
| 4,591,034 | 5/1986 | Tellert et al. | 192/3.58 |
| 4,629,045 | 12/1986 | Kasai et al. | 192/3.58 X |
| 4,685,062 | 8/1987 | Uriuhara et al. | 364/424.1 |
| 4,785,917 | 11/1988 | Tateno et al. | 192/3.58 X |
| 5,002,166 | 3/1991 | Leigh-Monstevens et al. | 192/3.58 X |
| 5,188,204 | 2/1993 | Arrowsmith et al. | 192/3.58 |

FOREIGN PATENT DOCUMENTS

P332157 12/1984 Fed. Rep. of Germany.
3900987 1/1989 Fed. Rep. of Germany.

Primary Examiner—Leslie A. Braun
Assistant Examiner—Andrea Pitts
Attorney, Agent, or Firm—Anderson Kill Olick & Oshinsky

[57] ABSTRACT

For emergency operation of an automatic friction clutch (3) of a truck which is operated during normal running by an electronic controller (9) via an electric motor driven actuator (11) and a hydraulic system (19, 21, 23), it is proposed that the clutch be controlled manually via a compressed air actuator (29), in particular via a compressed air servo actuator, by means of a changeover valve (39) which connects the compressed air actuator (29) alternately to a compressed air source (37) or via a flow throttle (41) to the atmosphere.

17 Claims, 3 Drawing Sheets

ARRANGEMENT FOR OPERATING A FRICTION CLUTCH OF A MOTOR VEHICLE, IN PARTICULAR OF A TRUCK

BACKGROUND OF THE INVENTION

The invention relates to an arrangement for operating a friction clutch of a motor vehicle, in particular of a truck.

To automate the clutch engaging and disengaging process when starting up or changing the gear speeds of a motor vehicle, it is known, for example from DE-A-33 21 578 (U.S. Pat. No. 4,591,034) to have the friction clutch thereof driven by a servo actuator which, in turn, is controlled via an electric motor, operating the servo control valve of the actuator, by an electronic controller as a function of operation parameters of the internal combustion engine or of the motor vehicle. A conventional clutch pedal acting mechanically on the disengager of the clutch is dispensed with in automatic friction clutches of this type. Emergency operation of the clutch in the event of a defect in the electric motor driving the clutch or in the electronic controller is not therefore possible.

SUMMARY OF THE INVENTION

From a first point of view, an object of the invention is to provide an arrangement which is suitable, in particular, for trucks, for emergency operation of an otherwise automatic operable friction clutch. The emergency operation arrangement should allow manual operation of the clutch with less expenditure and/or less space in the motor vehicle cab than with a conventional clutch pedal.

An arrangement according to the invention comprises a pneumatic actuator designed, in particular, as a pneumatic servo actuator for operating the friction clutch, an electric motor driven actuator, in particular for operating the pneumatic servo actuator and an electronic controller for the electric motor driven actuator. According to the invention, the pneumatic actuator is designed as a compressed air actuator supplied from a compressed air source, in particular as a compressed air servo actuator, of which the compressed air inlet can be connected via a manually controllable pneumatic changeover valve alternately to the compressed air source and to a flow throttle leading to the atmosphere, for emergency operation of the friction clutch.

An emergency operation arrangement of this type is independent of the running state of the electronic controller and utilizes, in particular, auxiliary energy sources which are present in a truck in any case for the emergency operation of the clutch. The pneumatic changeover valve is a two-position valve which, in one position, pressure loads the compressed air actuator so that the clutch is disengaged against the action of its clutch main spring while in the other position of the pneumatic changeover valve the compressed air actuator is vented in a throttled manner so that the clutch is engaged at a positioning rate determined by the cross section of flow of the flow throttle. A changeover valve of this type is relatively small and can easily be arranged at a suitable point in the driver's cab of the motor vehicle so that it can be controlled manually, i.e. by hand or foot operation. The compressed air actuator may be a simple power amplifier, for example in the form of a compressed air cylinder which travels into its two end positions depending on whether its working chamber is being loaded with compressed air or is being vented. However, the compressed air actuator is preferably a compressed air servo actuator in which the setting position of an input element acting on a servo control valve adjusts the output power and/or the position of an output element via a closed-loop control mechanism.

In a first embodiment of the invention, the electric motor driven actuator and the compressed air actuator operate separate hydraulic master cylinders of a hydraulic power transmission arrangement of which the hydraulic slave cylinder connected to the clutch can be connected via a manually controllable hydraulic changeover valve alternately to one of the two hydraulic master cylinders. It is possible to change over manually between normal automatic clutch running and emergency running by means of the hydraulic changeover valve. The hydraulic changeover valve is preferably a valve having high pressure resistance, in particular a ball-cock valve, to allow a changeover to emergency running even if the electric motor driven actuator has stalled with a defect in the engaged position and therefore with a master cylinder subjected to pressure.

Steps are preferably taken to disable the electronic controller when the hydraulic changeover valve changes over to emergency running. A switch coupled to the hydraulic changeover valve is preferably provided for this purpose.

In a further embodiment of the invention, in which a compressed air servo actuator, for example in the form of a servo power amplifier supplied from the compressed air source as an auxiliary source, is provided, the electric motor driven actuator controls the servo control valve of the compressed air servo actuator. In this case, the compressed air servo actuator is designed such that the pressure in its working chamber supplied from the compressed air source can be altered via the servo control valve and also via the manually controllable pneumatic changeover valve. A servo actuator of this type acts as a power amplifier for the electric motor driven actuator, and this is advantageous, in particular with high clutch operating powers of the type to be applied in trucks. The servo function of the actuator is not fully utilized in emergency running; the compressed air actuator acts as a mere auxiliary drive similar to a compressed air cylinder.

To rule out unintentional operation of the pneumatic changeover valve controlling the clutch during emergency running, the pneumatic changeover valve is preferably designed as an electrically deblockable valve arrangement which does not deblock until the changeover to emergency running and is therefore released for manual servicing or manual control of the compressed air actuator. To initiate emergency running in a preferred embodiment, a manually operable electric switch is provided which, when operated, disables the electronic controller and also deblocks the optionally provided electrically deblockable valves. Uncontrolled running states are also reliably prevented in this case by the disabling of the electronic controller during emergency running.

In a preferred embodiment, a pressure release line, which leads to a balancing tank and into which a valve opening on initiation of emergency running is connected, branches from the pressure side of the hydraulic master cylinder. In this way, the hydraulic circuit can be relieved of pressure on initiation of pneumatic emergency running Even if the electric motor driven actuator has stalled in its clutch-disengaging position, the clutch may therefore be engaged during the transition to emergency running. The valve opening on initiation of emergency running preferably controls a throttle path between the pressure side of the hydraulic master cylinder and the balancing tank, preferably an electrically deblockable bypass throttle path to a check valve which closes toward the balancing tank.

The throttle path ensures that the pressure side of the master cylinder is relieved only gradually, in other words that the clutch does not engage suddenly during the transition to emergency running.

The above-mentioned point of view is also important for other clutch operating arrangements with a compressed air servo actuator which do not allow manual engagement and disengagement of the clutch during emergency running. The manual nonreturn valve arranged in the pressure release line of the hydraulic power transmission system allows manual release of the pressure in the hydraulic system and therefore engagement of the friction clutch even in the absence of electric or pneumatic auxiliary power. The motor vehicle can therefore be started, for example, by jump-starting.

Automatic friction clutches of the type used in the scope of the invention are often also used together with an automatic pneumatically changeable gear which is also controlled by the electronic clutch controller. To allow an emergency mode of running of the gear when the clutch controller is switched off during emergency running, it is proposed in a preferred embodiment of the invention that the gear is allocated a manually operable pneumatic changer by means of which compressed air can be supplied selectively to the gear during emergency running for changing at least into the first gear, the reverse gear and into the neutral position. The pneumatic gear changer is simultaneously coupled to an electric switch by means of which emergency running is initiated and the electronic controller is disabled. It goes without saying that not only the gear speeds required for starting up but optionally also at least one further gear speed allowing emergency running can be engaged by means of the pneumatic gear changer.

The pneumatic gear changer is preferably attached to the compressed air source via the manually controllable pneumatic changeover valve. In this way, the pneumatic pressure required for changing the gear speed is applied to the gear changer only when the pneumatic changeover valve controlling the clutch is in its clutch-disengaging position. With suitable dimensioning of the compressed air lines, the clutch can initially be disengaged before the pneumatic pressure at the gear changer reaches a pressure which is adequate for gear operation. However, as this could lead to incorrect changes in individual cases, it is preferably proposed that the pneumatic gear changer be attached to the pneumatic changeover valve via an on-off valve mechanically coupled to the clutch, in particular the disengager thereof, the on-off valve being open in the clutch-disengagement position of the disengager and closed in the clutch-engagement position. In other words, the on-off valve is controlled as a function of the instantaneous position of the clutch disengager or of a part connected thereto, thus ensuring that the pneumatic pressure required for changing the gear is not applied to the gear changer until the clutch is disengaged.

In a variation which also ensures, during emergency running, that the gear changes after a time delay for disengaging the clutch and that the clutch engages after a time delay for changing the gear, it is proposed that the manually controllable pneumatic changeover valve is connected to the compressed air actuator via a check valve opening in the direction of flow to the compressed air actuator and is connected to the pneumatic gear changer via a check valve opening in the direction of flow toward the manually controllable pneumatic changeover valve, the two check valves being bridged over by bypass throttle paths. As a result, the pressure in the working chamber of the compressed air actuator builds up more quickly during disengagement of the clutch than at the gear changer whereas the pressure at the gear changer decreases more rapidly during engagement of the clutch than in the working chamber of the compressed air actuator. The throttle path in the bypass to the check valve opening toward the compressed air actuator can simultaneously assume the role of the flow throttle allocated to the manually controllable pneumatic changeover valve and leading to the atmosphere.

The various features of novelty which characterize the invention are pointed out with particularity in the claims annexed to, and forming part of, this disclosure. For a better understanding of the invention, its operating advantages and specific objects attained by its use, reference should be had to the accompanying drawings and descriptive matter in which there are illustrated and described preferred embodiments of the invention.

DESCRIPTION OF PREFERRED EMBODIMENTS

Figure 1:
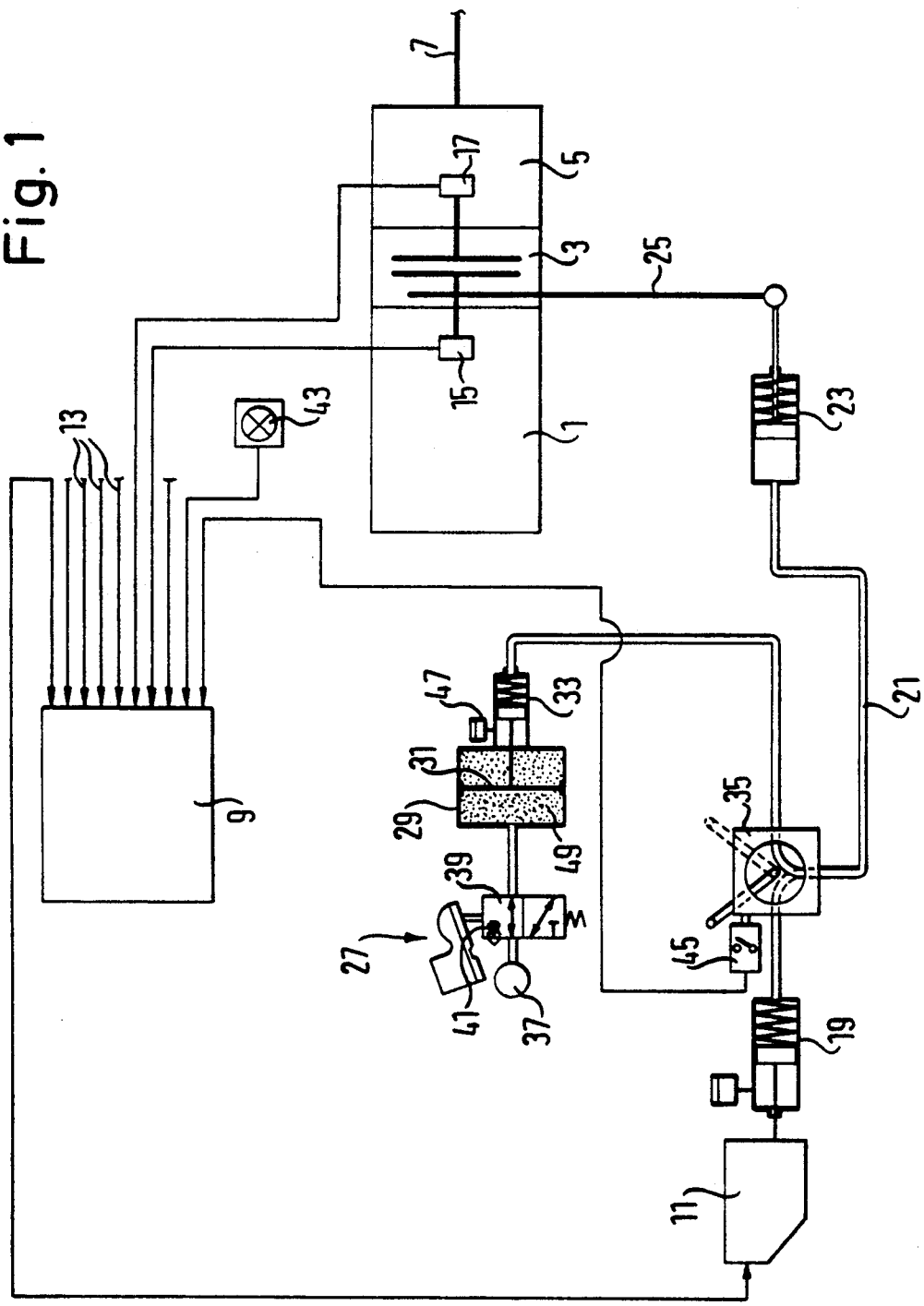
FIG. 1 is a schematic block circuit diagram of an arrangement for emergency operation of an automatic friction clutch of a truck.

The internal combustion engine 1, shown in FIG. 1, of a truck drives, via a conventional friction clutch 3, a gear 5 which can be changed in a manner not illustrated in detail, . for example can be changed manually, and of which the output shaft 7 acts upon the driving wheels of the truck. The clutch 3 is engaged and disengaged by an electronic controller 9 by means of an electric motor driven actuator 11 as a function of a plurality of operating data which are supplied to inputs 13 of the electronic controller 9. For example, sensors 15, 17 detect the input speed and the output speed of the clutch 3 whereupon the controller 9 controls the actuator 11 as a function of the travel situation such that the clutch closes smoothly both during a start up and during a change of speeds of the gear 5. Suitable methods of control are known and therefore will not be described in detail.

During normal operation, the electric motor driven actuator 11 operates a hydraulic master cylinder 19 which is connected via a hydraulic line 21 to a hydraulic slave cylinder 23, and the slave cylinder 23 acts in the conventional manner on a disengager 25 of the clutch 3. However, to enable the clutch 3 to be operated in an auxiliary manner in the event of a defect in the electronic controller 9 or the actuator 11, a pneumatic emergency operation arrangement 27 is provided by means of which the clutch 3 can be engaged or disengaged manually, though with loss of comfort, to enable the truck to be moved during emergency running. The emergency operation arrangement comprises a compressed air actuator 29 of which the piston arrangement 31 operates a further hydraulic master cylinder 33. A manually switchable hydraulic changeover valve 35 in the hydraulic line 21 connects the slave cylinder 23 alternately either to the master cylinder 19 operated by the electric motor driven actuator 11 or the master cylinder 33. The compressed air actuator 29 is supplied from a compressed air source 37 via a manually operable changeover valve 39, for example a 3/2 way valve. The compressed air source 37 can be the brake compressed air source often provided in a truck anyway. The changeover valve 39 connects the working pressure chamber of the actuator 29 either to the compressed air source 37 or to a flow throttle 41 leading to the atmosphere.

The emergency operation arrangement 27 functions as follows:

The controller 9 displays a defect of its electronic components or of the actuator 11 by an optical or acoustic warning signal 43. The driver of the truck then changes over the changeover valve 35 manually from the normal running position shown in broken lines into the emergency running position shown in solid lines. In this position, a switch 45 coupled to the changeover valve 35 is operated which disables the electronic controller 9 and therefore switches off the automatic mode of running of the clutch. If the defect has occurred while the clutch 3 is disengaged and the slave cylinder 23 is therefore pressure loaded, the slave cylinder 23 is released when the changeover valve 35 is changed over into the emergency running position toward a balancing tank 47 of the master cylinder 33. The changeover valve 35 is designed as a ball valve so that it can also be switched in the pressure-loaded state. The clutch 3 is engaged owing to the release of pressure from the slave cylinder 23.

During emergency running, the clutch 3 is engaged and disengaged by changing over the pneumatic changeover valve 39 either by foot operation or by manual operation. FIG. 1 shows the changeover valve 39 in the clutch 3-disengaging position in which the working pressure chamber 49 of the actuator 29 is connected to the compressed air source 37 and the working piston 31 operates the master cylinder 33. In its non-operated rest position, the changeover valve 39 which is spring-biased into the rest position vents the working pressure chamber of the actuator 29 to the atmosphere via the throttle 41. The throttled reduction of pressure in the working pressure chamber 49 leads to a gradual release of pressure in the master cylinder 33 and therefore to engagement of the clutch 3 at a positioning rate determined by the cross section of flow of the throttle 41. The clutch 3 for emergency running can be adequately manually controlled by multiple alternating changeovers of the valve 39.

Figure 2:
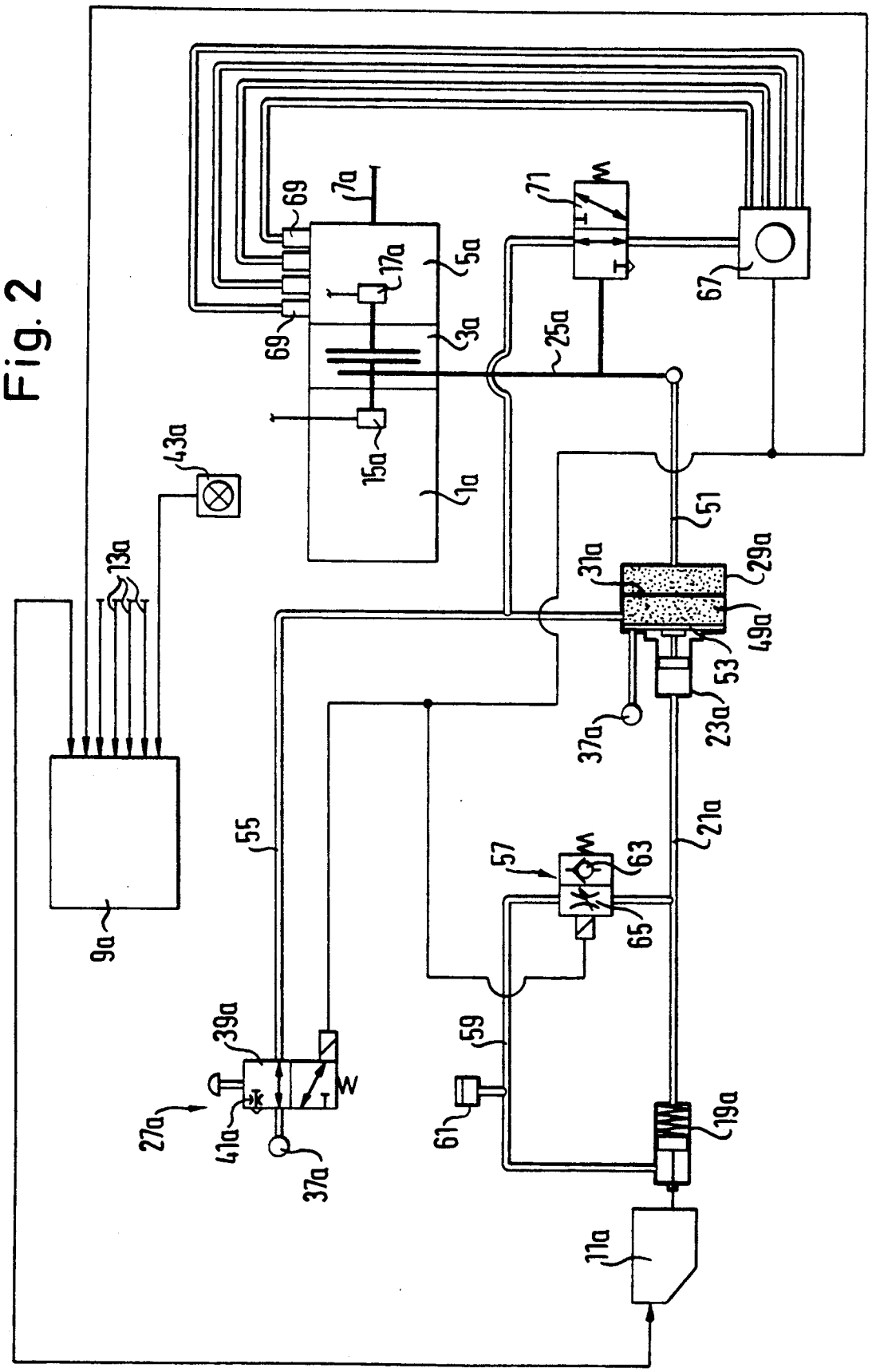
FIGS. 2 and 3 are schematic block circuit diagrams of variations of the emergency operation arrangement.

FIG. 2 shows a variation of an emergency operation arrangement for a truck with an automatically operable friction clutch which differs from the arrangement in FIG. 1 predominantly by the arrangement of the compressed air actuator. Similarly acting components are provided with the reference numerals from FIG. 1 and with the letter a for distinction. Reference is made to the description of FIG. 1 for explanation of the construction and mode of operation.

Whereas the compressed air actuator in the arrangement according to FIG. 1 acts via the hydraulic cylinders 23, 33 on the disengager 25 of the clutch 3, the compressed air actuator 29a of the arrangement according to FIG. 2 is designed as a servo power amplifier of which the output element 51 is mechanically coupled to the disengager 25a of the clutch 3a. The hydraulic master cylinder 19a operated by the electric motor driven actuator 11a as a function of the electronic controller 9a in normal operation acts via the hydraulic line 21a on the slave cylinder 23a which controls a servo control valve of the servo actuator 29a indicated at 53. The control valve 53 regulates the pressure in the working chamber 49a, supplied from the air pressure source 37a, of the servo actuator 29a to a value determined by the piston position of the slave cylinder 23a so that the working piston 31a designed, for example, as a diaphragm, via the output element 51, sets the disengager 25a power amplifier to a position determined by the actuator 11a.

An emergency running arrangement 27a by means of which the pressure in the working chamber 49a can be controlled independently of the hydraulic pressure is provided for emergency running. For this purpose, the working chamber 49a is connected via a pneumatic line 55 and the pneumatic changeover valve 39a to the compressed air source 37a. The changeover valve 39a in one position in turn connects the working chamber 49a to the compressed air source 37a while the working chamber 49a in the other position of the changeover valve 39a is vented to the atmosphere via the throttle 41a. To enable the pressure in the hydraulic side of the servo actuator 29a to be released during the transition from normal running to emergency running, the pressure side of the master cylinder 19a is connected via an on-off valve 57 in a pressure release line 59 to a pressure balancing tank 61. The on-off valve 57 contains a check valve 63 which blocks toward the pressure balancing tank 61 during normal running and can bridged over by a bypass throttle 65. If the on-off valve 57 is switched into the bridging position, the bypass throttle 65 allows a gradual release of pressure in the master cylinder 19a with the result that the clutch 3a initially engages slowly at the transition to emergency running.

The arrangement according to FIG. 2 functions as follows. A defect in the controller 13a or the actuator 11a is again displayed by the warning signal 43a. The driver then operates a gear emergency switch 67 which thereafter disables the controller 9a and will be described in detail hereinafter. At the same time, the valves 39a and 57 which are electrically unlockable valves are unlocked by the gear emergency switch 67. The changer 39a is released at its position closing the working chamber 35a of the servo actuator 29a during normal running so that it can now be changed over manually between the position loading the working chamber 35a with pressure and the position venting the working chamber 35a. After being unlocked, the on-off valve 57 switches automatically into the position which releases the pressure in the master cylinder 19a and is shown in FIG. 2. The clutch 3a can now be engaged and disengaged by operation of the changeover valve 39a.

The gear 5a comprises pneumatic actuators 69 by means of which the gear speeds can be switched automatically during normal running in a manner not shown in detail as a function of the controller 9a. When the controller 9a is disabled, the gear emergency switch 67 allows the changing of at least the first gear speed, the reverse gear, the neutral position of the gear and one further higher gear speed which is to be used during travel, for example the second or the fourth gear speed. For this purpose, the gear emergency switch 67 is designed as a pneumatic changer which is attached via an on-off valve 71, for example a 3/2 way valve, to the pneumatic line 55 leading from the changeover valve 39a to the servo actuator 29a. The on-off valve 71 is coupled mechanically to the disengager 25a or to an operating element coupled thereto and is switched into the open position shown in FIG. 2 as soon as the clutch 3a has reached its disengaged position. As the gear emergency switch 67 is supplied from the compressed air source 37a via the changer 39a, the changer 39a simultaneously also controls the changeover of the gear 5a according to the gear speed position manually adjusted at the gear switch 67. The gear switch 67 is supplied with compressed air as soon as the clutch 3a controlled into the disengagement position by the changer 39a has reached the disengagement position. This ensures that the gear is not changed until the clutch 3a is completely disengaged.

Figure 3:
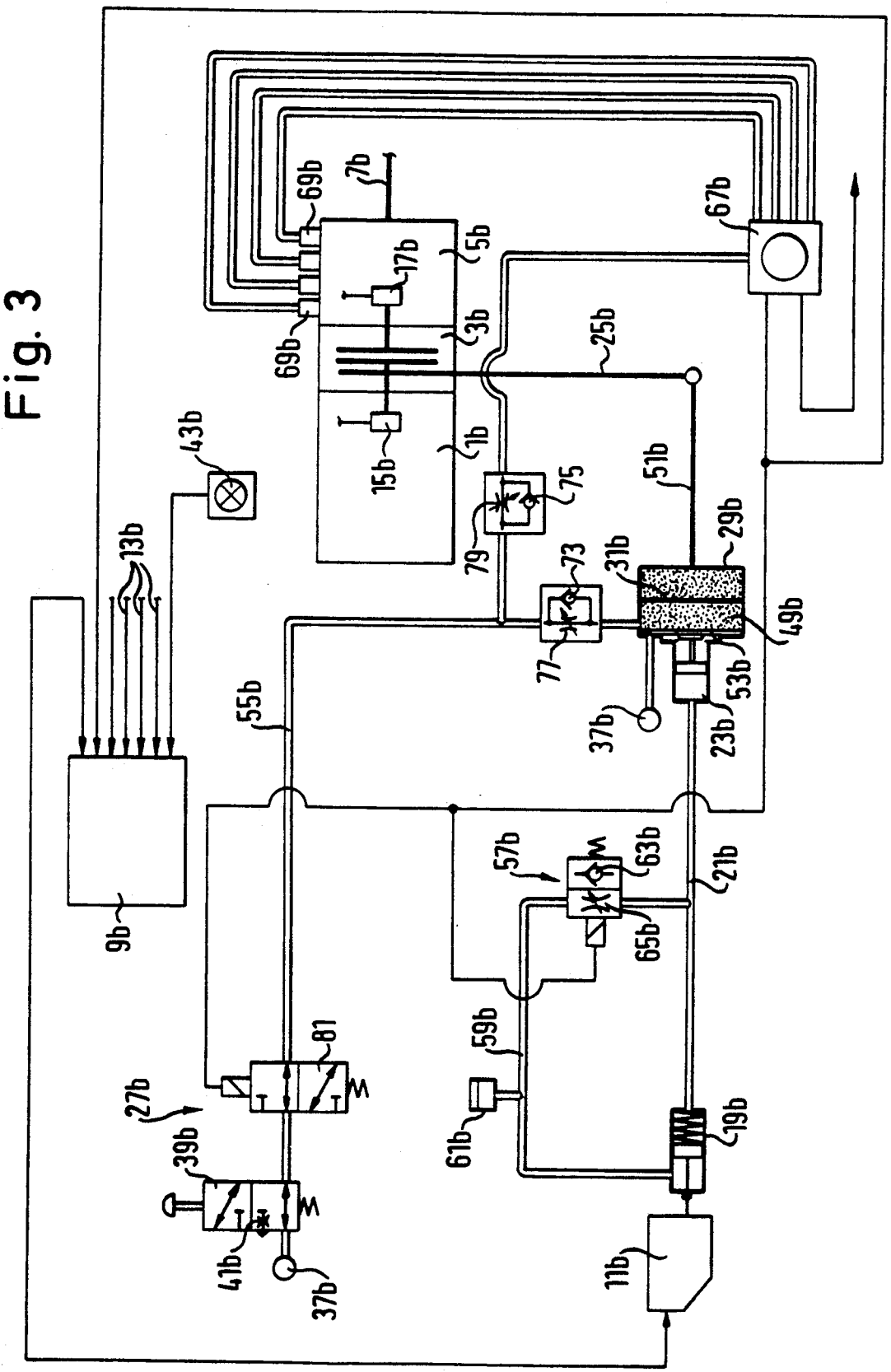

FIG. 3 shows a variation of the arrangement according to FIG. 2 which differs from this arrangement mainly by the components for the compressed air supply of the gear changer. Equally acting components are provided with the reference numerals from FIGS. 1 and 2 and with the letter b for distinction. Reference is made to the description of FIGS. 1 and 2 for explanation of the construction and the mode of operation.

Instead of the on-off valve 71 mechanically coupled to the operating element of the clutch in the arrangement according to FIG. 2, the pneumatic line 55b connected to the compressed air source 37b via the manually operable changeover valve 39b is connected via a respective check valve 73, 75 to the working chamber 49b of the compressed air servo actuator 29b and the compressed air inlet of the gear emergency switch 67b. Each of the check valves 73, 75 is bridged by a bypass throttle path 77 or 79. Whereas the 30 check valve 73 opens in the direction of flow from the changer 39b to the servo actuator 29b, the check valve 75 opens in the opposite direction from the gear emergency switch 67b to the changeover valve 39b. The throttle check valve arrangements delay clutch operation and gear operation relative to one another in time. If the changeover valve 39b is switched into the position which is shown in FIG. 3 and disengages the clutch 3b during emergency running, the check valve 73 opening toward the servo actuator 29b ensures that the working pressure in the working chamber 49b builds up more rapidly than at the gear emergency switch 67b to which the compressed air is supplied via the bypass throttle path 75 when the check valve 75 has a blocking action. The clutch 3b is therefore disengaged before the working pressure at the pneumatic actuator 69b of the gear 5b reaches a value which is adequate for changing the gear. If, on the other hand, the changeover valve 39b is switched into the engagement position, the working pressure at the actuators 69b decreases more rapidly via the now opening check valve 75 than in the working chamber 49b of the servo actuator 29b which is vented via the bypass throttle path 77. The gear changing process is therefore completed before the clutch 3b is completely engaged. The check valves 73, 75 in conjunction with the bypass throttle paths 77, 79 allow automatic control without the need for mechanical adjustment of operating elements of an on-off valve.

FIG. 3 also shows a variation of FIG. 2 in which the changeover value 39b cannot be unlocked electromagnetically as such but in which the pneumatic line 55b is connected via an electromagnetically operable on-off valve 81 to the outlet of the changeover valve 39b. The on-off valve 81 can be changed over electrically between a position blocking or clearing the outlet of the changeover valve 39b. A valve arrangement of this type can also be used instead of the changeover valve 39a. Similar valve arrangements with a separate on-off valve may also be used with the other electromagnetically unlockable valves of the arrangement, for example the throttle check valve 57. In order to control the valves 57b and 81, the gear emergency switch 67b is preferably provided with an opener contact to enable the valves to be brought into the emergency running position by spring force even in the event of a failure of the electrical system of the motor vehicle. It will be appreciated that the gear emergency switch 67b simultaneously produces release signals for the starter, contacts provided for this purpose on the emergency switch being designed as make-contacts for safety reasons.

It will be appreciated that the emergency operation arrangement described with reference to FIG. 2 or 3 can also be used with a gear which is to be changed manually. Furthermore, the pressure release arrangement illustrated can also be provided in the hydraulic system of the arrangement according to FIG. 1 or a different arrangement with a compressed air servo actuator.

While specific embodiments of the invention have been shown and described in detail to illustrate the application of the inventive principles, it will be understood that the invention may be embodied otherwise without departing from such principles.

What we claim is:

1. An arrangement for operating a friction clutch of a motor vehicle, in particular of a truck, comprising:
   a pneumatic actuator designed, in particular, as a pneumatic servo actuator for operating said friction clutch;
   an electric motor driven actuator, in particular, for operating said pneumatic servo actuator; and
   an electronic controller for said electric motor driven actuator, wherein said pneumatic actuator is designed as a compressed air actuator supplied from a compressed air source, in particular, as a compressed air servo actuator, of which a compressed air inlet is connectable, via a manually controllable pneumatic changeover valve, alternately to one of said compressed air source and to a flow throttle leading to the atmosphere, for emergency running of said friction clutch, wherein said electric motor driven actuator and said compressed air actuator operate separate hydraulic master cylinders of a hydraulic power transmission arrangement of which a hydraulic slave cylinder which is connectable to said clutch is connectable via a manually controllable hydraulic changeover valve alternately to one of said separate hydraulic master cylinders.

2. The arrangement of claim 1, wherein said hydraulic changeover valve is designed as a ball-cock valve.

3. The arrangement of claim 1, wherein said hydraulic changeover valve is coupled to a switch which disables said electronic controller in a position of said hydraulic changeover valve.

4. An arrangement for operating a friction clutch of a motor vehicle, in particular of a truck, comprising:
   a pneumatic actuator designed, in particular, as a pneumatic servo actuator for operating said friction clutch;

an electric motor driven actuator, in particular, for operating said pneumatic servo actuator; and an electronic controller for said electric motor driven actuator, wherein said pneumatic actuator is designed as a compressed air actuator supplied from a compressed air source, in particular, as a compressed air servo actuator, of which a compressed air inlet is connectable via a manually controllable pneumatic changeover valve, alternately to one of said compressed air source and to a flow throttle leading to the atmosphere, for emergency running of said friction clutch;

wherein said electric motor driven actuator controls a servo control valve of said compressed air servo actuator, and wherein said compressed air servo actuator is designed such that the pressure in its working chamber, supplied from said compressed air source, is controllable via servo control valve and via said manually controllable pneumatic changeover valve, wherein said manually controllable pneumatic changeover valve is designed as an electrically deblockable valve arrangement.

5. An arrangement for operating a friction clutch of a motor vehicle, in particular of a truck, comprising:

a pneumatic actuator designed, in particular, as a pneumatic servo actuator for operating said friction clutch;

an electric motor driven actuator, in particular, for operating said pneumatic servo actuator; and an electronic controller for said electric motor driven actuator, wherein said pneumatic actuator is designed as a compressed air actuator supplied from a compressed air source, in particular, as a compressed air servo actuator, of which a compressed air inlet is connectable, via a manually controllable pneumatic changeover valve, alternately to one of said compressed air source and to a flow throttle leading to the atmosphere, for emergency running of said friction clutch, wherein said electric motor driven actuator controls a servo control valve of said compressed air servo actuator, and wherein said compressed air servo actuator is designed such that the pressure in its working chamber supplied from said compressed air source, is controllable via said servo control valve and via said manually controllable pneumatic changeover valve wherein, for initiating emergency running, there is provided a manually operable electric switch which, when operated, disables said electronic controller and optionally deblocks an electrically deblockable valve arrangement.

6. An arrangement for operating a friction clutch of a motor vehicle, in particular of a truck, comprising:

a pneumatic actuator, designed, in particular, as a pneumatic servo actuator for operating said friction clutch;

an electric motor driven actuator, in particular, for operating said pneumatic servo actuator and;

an electronic controller for said electric motor driven actuator, wherein said pneumatic actuator is designed as a compressed air actuator supplied from a compressed air source, in particular, as a compressed air servo actuator, of which a compressed air inlet is connectable, via a manually controllable pneumatic changeover valve, alternately to one of said compressed air source and to a flow throttle leading to the atmosphere, for emergency running of said friction clutch, wherein, from a pressure side of said hydraulic master cylinder there branches a pressure release line which leads to a balancing tank and into which a valve, which opens on initiation of an emergency running, is connected.

7. The arrangement of claim 6, wherein said valve at least one of blocks and opens a throttle path between the pressure side of said hydraulic master cylinder and said balancing tank.

8. The arrangement of claim 7, wherein said valve is designed as a check valve which closes toward said balancing tank and is designed with an electrically deblockable bypass throttle path.

9. An arrangement operating a friction clutch of a motor vehicle, in particular of a truck, comprising:

a pneumatic actuator, designed, in particular, as a pneumatic servo actuator for operating said friction clutch;

an electric motor driven actuator, in particular, for operating said pneumatic servo actuator; and an electronic controller for said electric motor driven actuator, wherein said pneumatic actuator is designed as a compressed air actuator supplied from a compressed air source, in particular, as a compressed air servo actuator, of which a compressed air inlet is connectable, via a manually controllable pneumatic changeover valve, alternately to one of said compressed air source and to a flow throttle leading to the atmosphere, for emergency running of said friction clutch, wherein the motor vehicle as a pneumatically changeable gear, wherein said gear is allocated a manually operable pneumatic gear changer by means of which compressed air can be supplied selectively to said gear during emergency running for changing at least into the first gear, the reverse gear and into the neutral position, and further wherein said pneumatic gear changer is coupled to an electric switch for initiating emergency running and for disabling said electronic controller.

10. The arrangement of claim 9, wherein said pneumatic gear changer is attached to said compressed air source via said manually controllable pneumatic changeover valve.

11. The arrangement of claim 10, wherein said pneumatic gear changer is attached to said manually controllable pneumatic change-over valve via an on-off vale mechanically coupled to clutch, wherein said on-off valve is open in a disengaged position and closed in an engaged position of said clutch.

12. The arrangement of claim 10, wherein said manually controllable pneumatic changeover valve is connected to said compressed air actuator via a first check valve opening in the direction of flow to said compressed air actuator and is connected to said pneumatic gear changer via a second check valve opening in the direction of flow toward said manually controllable pneumatic changeover valve and wherein said first and said second check valves are bridged over by bypass throttle paths.

13. An arrangement for operating a friction clutch of a motor vehicle, in particular of a truck, comprising:

a pneumatic servo actuator for operating said clutch;

an electric motor driven actuator for operating a servo control valve of said servo actuator;

an electronic controller for said electric motor driven actuator; and a hydraulic power transmission arrangement with a hydraulic master cylinder and a hydraulic slave cylinder in an operating power path between said electric motor driven actuator and said pneumatic servo actuator wherein said pneumatic servo actuator is designed as a compressed air servo actuator supplied from a compressed air source and further comprising a pressure release line branching from a pressure side of said hydraulic master cylinder, wherein said pressure release line leads to a balancing tank and contains a valve which is controllable via a manually operable service element.

14. The arrangement of claim 13, wherein said valve blocks and opens a throttle path between the pressure side of said hydraulic master cylinder and said balancing tank.

15. The arrangement of claim 14, wherein said valve is designed as a check valve which blocks toward said balancing tank and has an electrically deblockable bypass throttle path.

16. The arrangement of claim 13, wherein said hydraulic power transmission arrangement is arranged between said electric motor driven actuator and said compressed air servo actuator.

17. The arrangement of claim 16, herein said compressed air servo actuator is connected to said clutch via a mechanical power transmitting means.

* * * * *